US008388287B2

(12) United States Patent
Arnold et al.

(10) Patent No.: US 8,388,287 B2
(45) Date of Patent: Mar. 5, 2013

(54) SINGLE POINT RELEASE MECHANISM FOR ADJUSTABLE DECKING

(75) Inventors: Mark E. Arnold, Auburn, IN (US); Steven E. Downing, Tomah, WI (US)

(73) Assignee: Con-Way Transportation Services, Inc., Ann Arbor, MI (US)

( * ) Notice: Subject to any disclaimer, the term of this patent is extended or adjusted under 35 U.S.C. 154(b) by 0 days.

(21) Appl. No.: 13/156,535

(22) Filed: Jun. 9, 2011

(65) Prior Publication Data
US 2011/0318133 A1 Dec. 29, 2011

Related U.S. Application Data

(60) Provisional application No. 61/353,422, filed on Jun. 10, 2010.

(51) Int. Cl.
*B61D 45/00* (2006.01)
(52) U.S. Cl. ........................................... 410/150
(58) Field of Classification Search .................. 410/150, 410/143, 127, 129, 130
See application file for complete search history.

(56) References Cited

U.S. PATENT DOCUMENTS

| | | | | |
|---|---|---|---|---|
| 880,010 A * | 2/1908 | Caha | ................. | 296/51 |
| 2,627,821 A * | 2/1953 | Sjogren | .................. | 410/145 |
| 2,659,319 A * | 11/1953 | Hermann | .................. | 410/150 |
| 2,977,899 A * | 4/1961 | Doherty et al. | .............. | 410/149 |
| 3,090,329 A * | 5/1963 | Rolfe, Jr. | ................. | 410/148 |
| 3,095,830 A * | 7/1963 | Runken | .................. | 410/89 |
| 3,151,571 A * | 10/1964 | Heard | ................... | 410/149 |
| 3,265,433 A * | 8/1966 | Shea | ..................... | 296/57.1 |
| 3,836,174 A | 9/1974 | Holman, Jr. | | |
| 4,049,311 A * | 9/1977 | Dietrich et al. | .............. | 410/138 |
| 4,208,970 A * | 6/1980 | Matyas | ................. | 410/153 |
| 4,294,569 A * | 10/1981 | Lewis et al. | ................. | 410/133 |
| 4,702,653 A * | 10/1987 | Gaulding et al. | ............ | 410/144 |
| 4,722,646 A * | 2/1988 | McIntyre | .................. | 410/138 |
| 6,074,143 A | 6/2000 | Langston et al. | | |
| 6,112,964 A * | 9/2000 | Cucheran et al. | ............ | 224/321 |
| 6,364,583 B1 | 4/2002 | Koller | | |
| 6,517,137 B2 * | 2/2003 | Kiester et al. | ............... | 296/39.2 |
| 6,705,812 B1 * | 3/2004 | Benedict et al. | ............. | 410/153 |
| 6,749,383 B1 * | 6/2004 | Benedict et al. | ............. | 410/153 |
| 6,895,867 B1 | 5/2005 | Burrows | | |
| 7,393,034 B2 * | 7/2008 | Brussard et al. | ........... | 296/24.41 |
| 8,172,494 B1 | 5/2012 | Knox | | |

* cited by examiner

*Primary Examiner* — H Gutman
(74) *Attorney, Agent, or Firm* — The Dorbrusin Law Firm, P.C.

(57) ABSTRACT

An adjustable cargo support system comprising: at least one pair of spaced apart tracks that are generally vertically oriented proximate at least one wall of a transport vehicle; at least one support cross member with two ends and an intermediate portion therebetween; and a means for adjusting a height of the support cross member, which includes one actuator device that is generally located between the support cross member ends, so that a user adjust the height of the support cross member at a central location, thereby allowing the support cross member to be moved generally vertically without the user alternatingly having to move one end of the support cross member and then the other end of the support cross member.

17 Claims, 6 Drawing Sheets

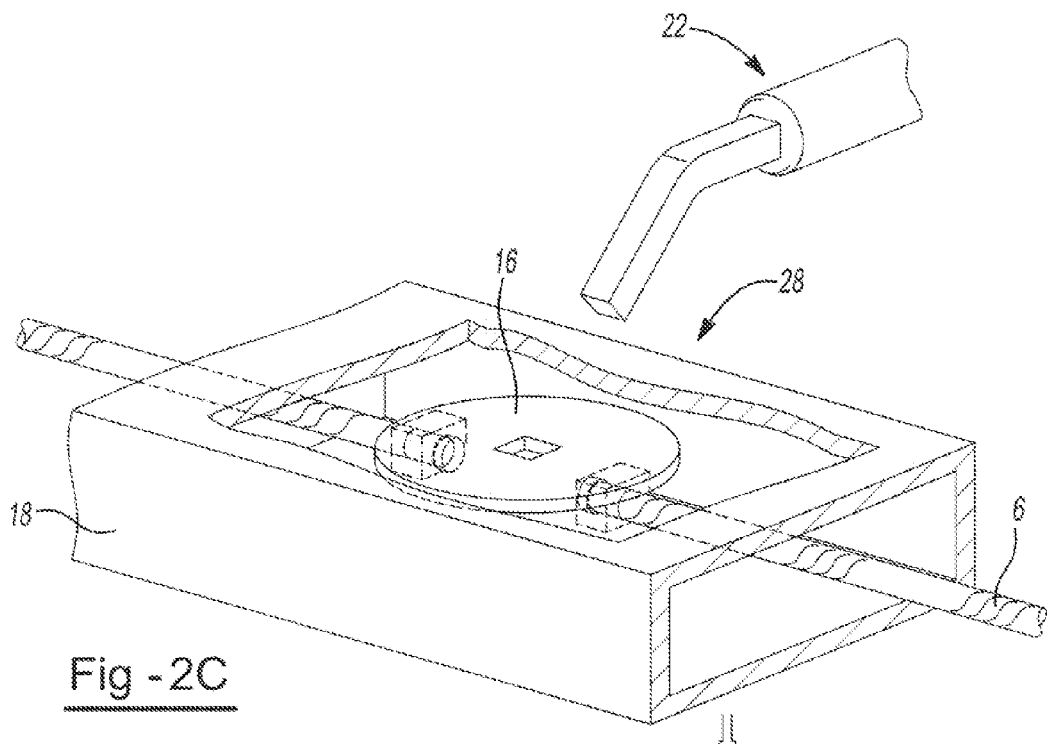
Fig -2C
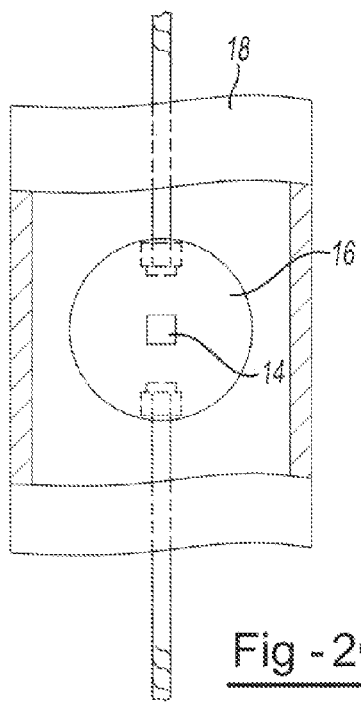
Fig -2C'
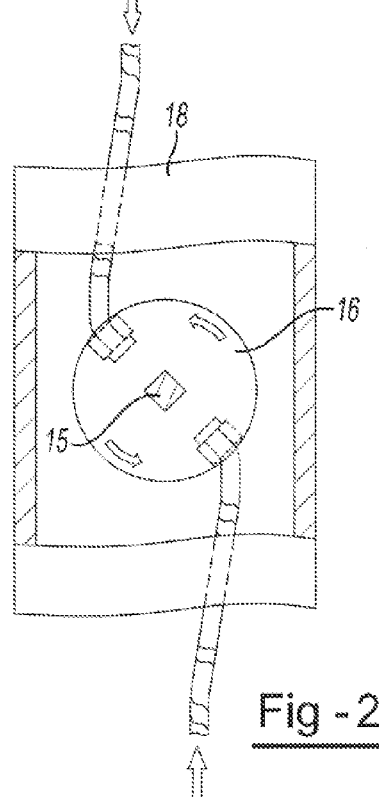
Fig -2C"

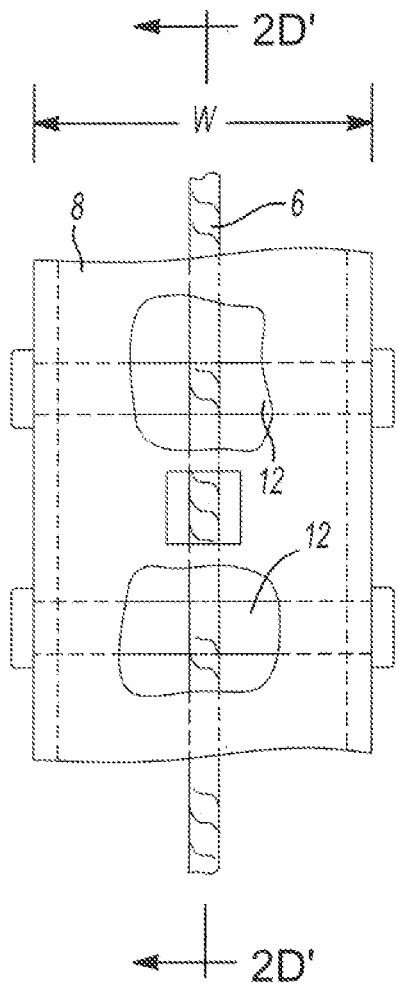
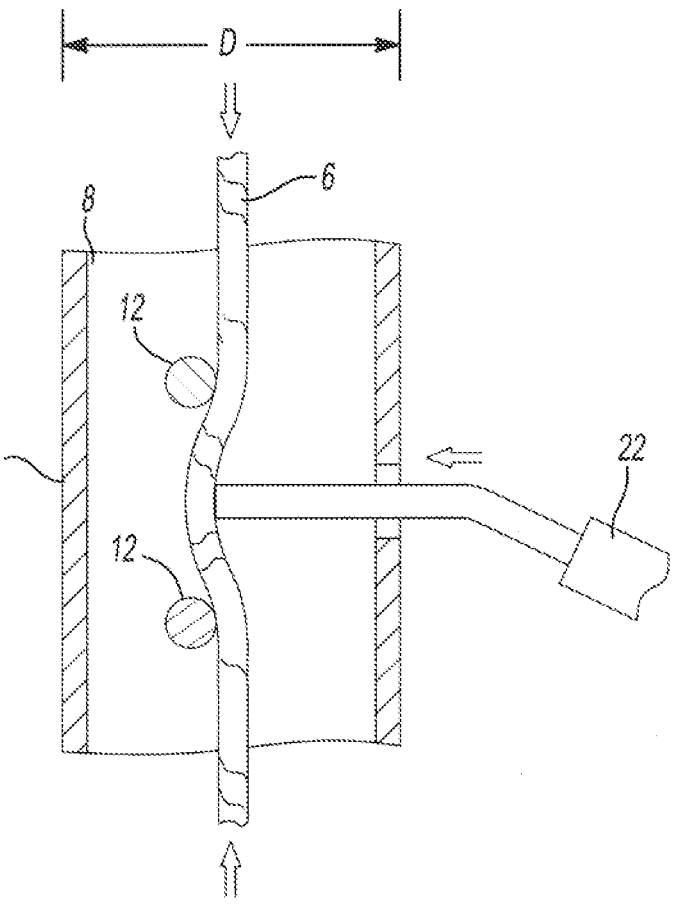
Fig -2D
Fig -2D'

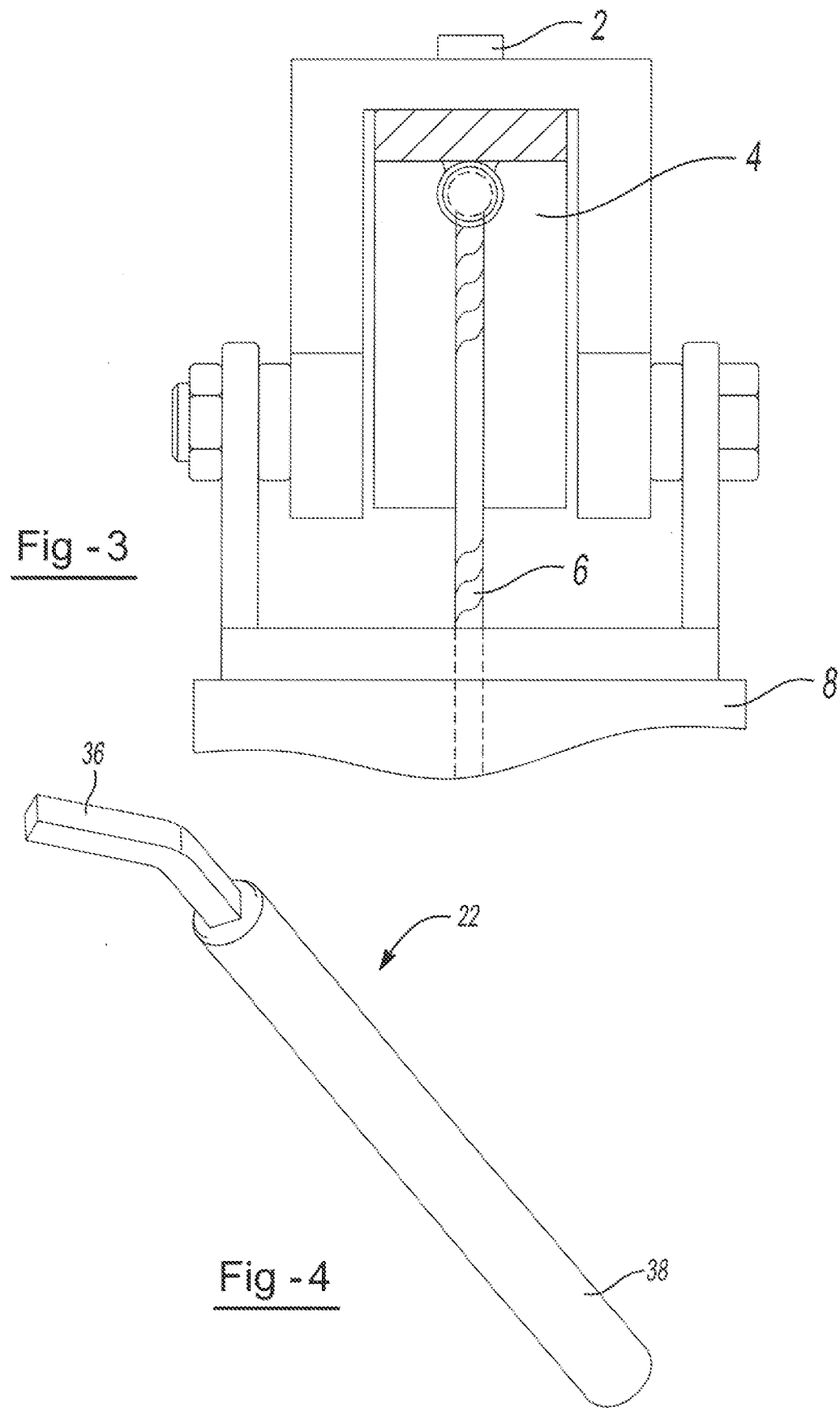

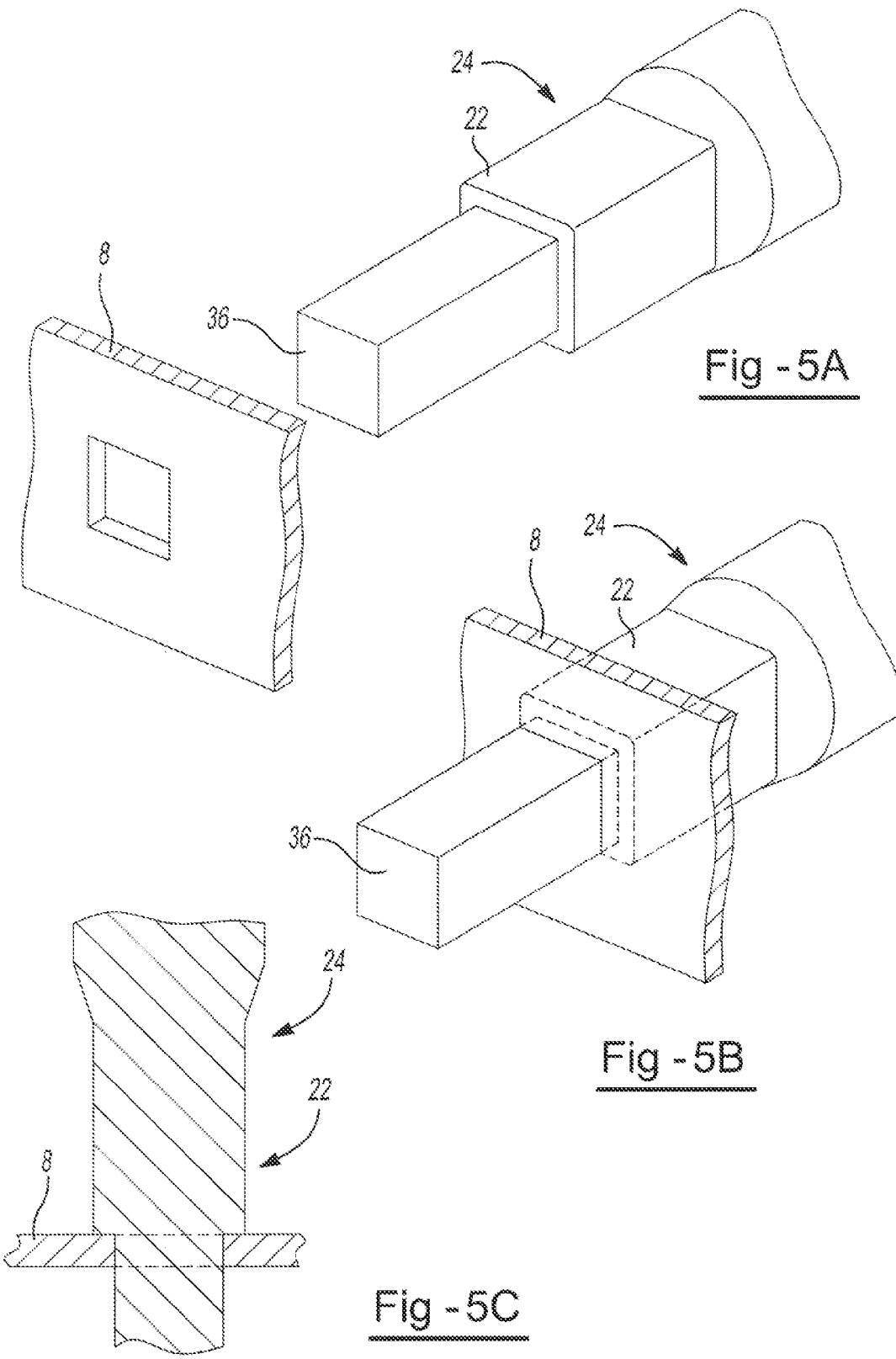

SINGLE POINT RELEASE MECHANISM FOR ADJUSTABLE DECKING

CLAIM OF PRIORITY

The present teachings are related to U.S. Provisional Application Ser. No. 61/353,422 filed Jun. 10, 2010, the contents of which are incorporated by reference herein.

FIELD OF THE INVENTION

The present teachings generally relate to a cargo support system and more particularly a cargo support system for use in a trailer where both sides of a support cross member of the cargo support system may be moved simultaneously.

BACKGROUND OF THE INVENTION

In transport vehicles for handling freight such as trucks, ships, and rail road cars, typically the cargo is placed on the floor of a container and the container is connected to and/or placed in the transport vehicle. In storing the cargo on the floor of the container only, the entire volume of the carrier may not be used, thus, a container may be transported that is not filled to capacity. Some cargo support systems have been created that allow for more packages to be stacked in a container. Examples of such cargo support systems are disclosed in U.S. Pat. Nos. 6,895,867; 6,364,583; and 6,074,143 all of which are expressly incorporated herein by reference for all purposes. Such cargo support systems often will include at least one support cross member that is adjustably connected at its end to a pair of vertical tracks. An example of a commercially available cargo support system is that offered under the name Lift-A-Deck® II, from Ancra, LLC.

One disadvantage faced by these cargo support systems is that the support cross member may only be moved when the user is in proximity with a lock on an end of the support cross member. The user may have to move one end of the support cross member and then move to the other side of the support cross member and then repeat these steps until the desired height of the support cross member is achieved. This may be very time consuming and inefficient as a container may include 10, 15, 20, 25 or more support cross members that may need to be moved. What is needed is a support cross member that allows the user to operate both locks simultaneously. It is also important for any such system to be able to resist static and/or dynamic forces that are applied on the support cross member during transit by the loads that are placed on the support cross member.

SUMMARY OF THE INVENTION

One possible embodiment of the present teachings includes: an adjustable cargo support system comprising: at least one pair of spaced apart tracks that are generally vertically oriented proximate at least one wall of a transport vehicle; at least one support cross member with two ends and an intermediate portion therebetween; and a means for adjusting a height of the support cross member, which includes one actuator device that is generally located between the support cross member ends, so that a user adjust the height of the support cross member at a central location, thereby allowing the support cross member to be moved generally vertically without the user alternatingly having to move one end of the support cross member and then the other end of the support cross member. It is further contemplated that the present teachings described herein may be adapted to allow a user to slide support cross members horizontally.

One unique aspect of the present teachings envisions a lock actuating device which may allow a user to actuate both locks from one central location so that the entire support cross member may be moved without the user having to move one side of the support cross member and then the other side of the support cross member. The lock actuating device may be in communication with both locks so that both locks may be locked and unlocked without the user being in proximity to the locks.

BRIEF DESCRIPTION OF THE DRAWINGS

FIGS. 2C-C" illustrate possible cam mechanisms that may be used;

FIGS. 2D-D' illustrate more possible tensioning devices of the present teachings;

FIG. 3 illustrates one possible end portion of the present teachings;

FIG. 4 illustrates one embodiment of an operating rod; and

FIG. 5A-C illustrate possible operating rods that include stops.

DETAILED DESCRIPTION OF THE INVENTION

Figure 1:
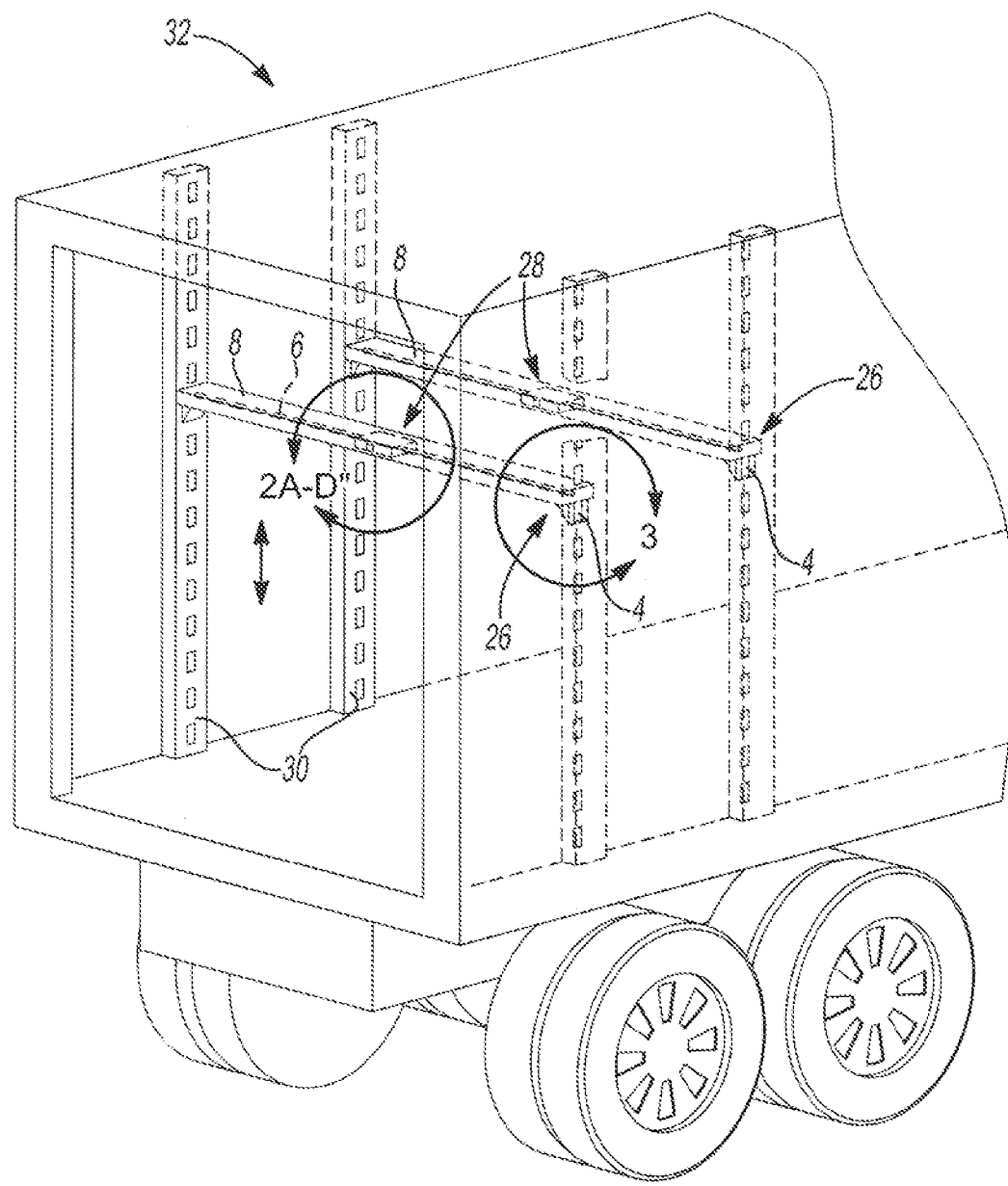
FIG. 1 illustrates the present teachings located in a container.

The following description of the preferred embodiment(s) is merely exemplary in nature and is in no way intended to limit the teachings, its application, or uses.

The present teachings are predicated upon providing an improved adjustable cargo support system that may be adjusted according to the height of an item to be stored. For example, a cargo support system may be used with a container that may be placed in and/or on a vehicle such as a trailer, cargo ship, train, or the like. Alternatively, the adjustable cargo support system may be integrated into a cargo support system that is used in a warehouse, garage, barn, or any other shelving unit.

Generally, a cargo support system includes one or more tracks. Preferably, the cargo support system includes at least two tracks that are vertically mounted on the walls of a container. A support cross member (e.g. a beam) spans between the two tracks and lockingly attaches to the tracks. The support cross member may be about 4 feet or longer, about 6 feet or longer, about 8 feet or longer, or even about 12 feet or longer. The support cross member may be about 20 feet or shorter, about 18 feet or shorter or about 15 feet or shorter. Most preferably, the support cross member is about 8 feet long. The support cross member includes two ends and each end includes a guide shoe with a lock that is pivotally mounted to the guide shoes. The lock removably attaches to the tracks so that items can be supported on the support cross member.

The present teachings includes a lock actuating device (i.e. a trigger cable) that spans the length of the support cross member and attaches to the locks at the end of the support cross member. The lock actuating device may be the same length as the support cross member. The present teachings further includes a lock actuating tensioning mechanism attached to the lock actuating device so that tension is applied to the locks. When tension is applied to the lock actuating device the locks may be pivotably moved so that the support cross member may be raised and/or lowered along the tracks.

The present teachings may further include an operating rod so that the lock actuating tensioning mechanism may be triggered when the support cross member is located in a stored position or is located out of reach of the user. The one or more tracks may have any track configuration that is load bearing. The tracks may be mounted (e.g., generally vertically) to one of more walls of a cargo container of a transport vehicle, such as to one or opposing walls of a container such as a trailer. Preferably, each cargo support system includes at least two tracks that are vertically mounted in a container on each end of a support cross member. However, the tracks may not be fixedly attached to the walls of the container (i.e. the support cross member may press the tracks against the walls of the trailer so that they do not move). It is contemplated that there may be four tracks (i.e. two on each side of the support cross member so that the support cross member has a dual lock on each side). The tracks may include one or more generally spaced apart slots, holes, attachment points, or the like. Preferably, the tracks may include about 10, about 20, about 30, about 40, or even about 50 or more slots, holes, and/or attachment points. Each container may include about 1, about 5, about 10, about 15, about 20, about 25, or more cargo support systems along the length of the container (i.e. one or more tracks and a support cross member).

The one or more support cross members may be any configuration that may be load bearing. The support cross member may be any shape that may support a load along the length of the support cross member. For example, the support cross member may be circular, triangular, oval, or the like. The support cross member may be square or rectangular. The one or more support cross members may be solid. The support cross member may be hollow. The support cross members may have at least tow pairs of opposing spaced apart inner walls. The support cross member may be made of any material that is able to support a heavy load. The support cross member may be made of plastic, metal, a composite material, or the like. Preferably, the support cross members may be made of aluminum. The support cross member may have one or more ends. The support cross member may have three or four ends. Preferably, the support cross member may have two ends that span the width of a container. The support cross members may be used to support a pallet on which cargo is present. The support cross members may be used to support a panel onto which cargo is placed with or without a pallet. One or more support cross members may be covered by a sheet of material (i.e. plywood). Preferably, three or more of the support cross members may be covered by a sheet of material before cargo is placed on the sheet of material and the support cross members. The beam may be configured to house within in a lock actuating device.

The ends of the support cross member may include one or more guide shoes that may be in contact with the one or more tracks. The guide shoes may allow the support cross members to be moved along the tracks without the support cross members falling off the tracks. The guide shoes may movably secure the support cross member to the tracks (e.g. the guide shoes may allow a user to move the support cross member up and down along the tracks without the support cross member moving horizontally off the tracks). The one or more guide shoes may include a roller that fits in a guide located in the track. The one or more guide shoes may have an end portion that matingly fits into a portion of the track so that the support cross member cannot be pulled out of the track.

One or more locks may be attached to the support cross member, the guide shoes, or both. Preferably, the one or more locks may be pivotally attached to the guide shoes. Additional aspects of the teachings can be gleaned from the teachings herein, including those of FIGS. 1-3 of Provisional application Ser. No. 61/353,422, filed on Jun. 10, 2010, incorporated by reference here to show various alternative embodiments of possible devices that may be used on the end portions (i.e. guide shoes, locks, trigger cables, etc . . . ). The locks may be any shape and size suitable for locking the support cross member in place so that the support cross member may support a load. Preferably, the locks may be a shape and size that may be used with the slots, holes, and/or attachment points located in the tracks. The locks may lock in any manner that allows the locks to restrain the support cross member so that the support cross member supports a load and does not move. The locks may move linearly (e.g. moved directly in and/or out). The locks may be a pin that is placed through support cross member and or guide shoes to lock the support cross member in place. The locks may include a hinge. Preferably, the locks may pivotally move so that the locking mechanism is removed from the slot, hole, or attachment point of the track so that the support cross member may be moved to a desired location. The locks may include a mechanical movement device (i.e. spring, clip, washer, or the like) that biases the lock so that the default position for the lock is the locked position.

The present teachings may include a lock actuating device (e.g. including a trigger cable or some other elongated member that spans at least part of the beam length to operatively engage a lock). Preferably, the lock actuating device is longer than the support cross member by about 5 percent or more, about 10 percent or more, or even about 15 percent or more. More preferably the lock actuating device is long enough so that the locks are not triggered to open during storage or transit. For example, the lock actuating device may include some slack so that the lock actuating device is not incidentally tensioned causing the locks to actuate. The lock actuating device may be any device that functions to actuate both locks simultaneously from a central location so that the support cross member may be moved in one fluid motion. Preferably, the lock actuating device may be any device capable of moving each lock far enough so that the locks release and the support cross member may be moved (i.e. about ¼ in for each lock). For example, the lock actuating device may be a cable, rope, band, cord, or the like that is located in proximity to the support cross member and is connected to the locks at the ends of the support cross member and is strong enough to create tension so that the locks are actuated. Preferably, the lock actuating devices may be a trigger cable that is located inside the support cross member and is fixedly attached to the locks so that when tension is applied to the trigger cable both locks are actuated and the support cross member may be moved to its desired location. More preferably, the lock actuating device may be a 0.0024 mm (i.e. ¹⁄₁₆ in) cable. However, other size cables may be used such as ⅛ in, ³⁄₁₆ in, or ¹⁄₃₂ in. It is further contemplated that the lock actuating device may be a pneumatic or hydraulic line that may be pressurized by a user so that an actuator is inflated and moves the locks into the open position so that the support cross member may be used. In yet another embodiment, the locks may be actuated electronically so that the locks are moved and the support cross member may be moved to its desired location.

A cam mechanism may be attached to the support cross member, to the lock actuating device, or both. The cam mechanism may be any device that is able to create tension on the lock actuating device. The cam mechanism may be operated by hand. Preferably, the cam mechanism may be operated using a tool (i.e. an operating rod or some other suitable lever) so that the locks are not actuated accidentally during use. The cam mechanism may be a lever that is moved to apply tension on the cable so that the locks are actuated. Preferably, the cam mechanism may be a device that is rotatable so that when the cam is rotated the tension on the wire increases and actuates the locks. Preferably, when the cam mechanism is moved equal amounts of pressure are applied to each lock so that both sides of the support cross member slide freely. The cam may include an engagement mechanism so that when the cam is rotated the engagement mechanism may be engaged to hold the cam in place so that the locks remain actuated without continued movement from the user. It is contemplated that the present teachings may be free of a cam mechanism. The cam mechanism may include a key hole so that an operating rod may enter the key hole and actuate the locks.

The support cross member may include a key hole or other suitable structure for accessing the lock actuation device from a location external of the cross member. The cam may further include a key hole. However, it is contemplated that the support cross member may not include a cam and may only include a key hole. The key hole may be any shape and size so that tension may be applied on the trigger cable so that the locks are actuated. The key hole may be circular, oval, triangular, square, rectangular, pentagonal, heptagonal, octagonal, or the like. Preferably, the key hole may be hexagonal. More preferably, the key hole and the operating rod may be the same shape and/or size. The key hole may be located at any location along the support cross member. Preferably, the key hole may be located generally in the center of the support cross member (i.e. length of the support cross member and/or width of the support cross member). More preferably, the key hole may be located on a side or the bottom of the key hole and generally the center of the support cross member.

It is further contemplated that the present teachings may include one or more key holes centrally located so that a user may lower one end at a time without having to move from end to end of the beam. The user may insert the operating rod into one key hole so that one end may be lowered. The user may insert the operating rod into both key holes so that both ends may be lowered simultaneously. For example, the support cross member may include two cams, and each cam may only attach to one lock so that one cam moved and only one lock actuated. In another example, the support cross member may include two lock actuating devices and the lock actuating devices may be span the full length of the beam. The lock actuating devices may attach to only one lock so that each lock may be actuated separately. However, both lock actuating devices may be actuated simultaneously so that both locks are actuated and the support cross member may be lowered in one movement.

The operating rod or some other suitable lever may be of any shape and size that allows a user to operate a cam so that tension is applied on an actuating device. The operating rod may be of any shape that allows a user to operate the cam mechanism and/or fits into the key hole in the cam mechanism. At least one end of the operating rod may be circular, oval, triangular, square, rectangular, pentagonal, heptagonal, octagonal, or the like. Preferably, at least one end of the operating rod may be hexagonal. The operating rod may include a stop. The stop may be any device that prohibits the end of the operating rod from penetrating too deeply into the key hole. The stop may be a sleeve, a bolt, a flange, a flare, a bump, or any other device that will limit the depth the operating rod may enter the key hole. Preferably, the stop will be located down the operating rod far enough so that the operating rod may be pushed into the key hole deep enough that the locks are actuated and the support cross member may be moved.

It is contemplated that the lock actuating device may be actuated by a force being applied the lock actuating device. A force may be applied to elongate the lock actuating device by a force application between a member (e.g. a tensioning member, a compressing member, etc . . . ) via an opening in the beam from a location external of the structural cross member to cause the force application member to engage and release the locks substantially simultaneously.

The present teachings may include an extrusion chamber. The extrusion chamber may be any additional part that may be included inside the support cross member. The extrusion chamber may be any additional piece that provides additional support to the support cross member where the key hole is cut in the support cross member. The extrusion chamber may be made of any material that adds additional support to the support cross member. The extrusion chamber may be made of plastic, metal, or a composite material. Preferably, the extrusion chamber may be made of metal. More preferably, the extrusion chamber may be made of aluminum. The extrusion chamber may be any shape that adds additional support to the support cross member. The extrusion chamber may be round, oval, square, triangular, or the like. Preferably, the extrusion chamber may be square. More preferably, the extrusion chamber may be the same shape as the support cross member.

One or more structural bolts may be added to the support cross member and/or extrusion chamber. The structural bolts may reduce the amount the support cross member stretches when the carrier is in transit (e.g. as the walls of the carrier flex the support cross member may not stretch as much as before the structural bolts were added). The structural bolts may restrict the amount of movement the lock actuating device receives during transit so that the lock actuating device does not accidentally actuate the locks. The support cross member may be free of structural bolts. Additional aspects of structural bolts can be gleaned from the teachings herein, including those of FIG. 4 of Provisional application Ser. No. 61/343, 422, dated Jun. 10, 2010, incorporated by reference herein, which shows various alternative embodiments.

The present teachings may include one or more tensioning devices (i.e. wires or cables). Preferably, the cargo support system includes two tensioning devices that span the width of the support cross member. More preferably, the one tensioning device may be located on one side of the key hole and one tensioning device may be located on the other side of the key hole. The tensioning devices may be located at any distance from the key hole so that when pressure is applied on the trigger cable the trigger cable becomes tense and the locks are actuated. Preferably, the tensioning devices are located equal distance from the key hole so that tension is applied evenly to the two lock mechanisms. The cargo support system may be free of tensioning devices. The tensioning devices may be located about 1 mm or more from the key hole, about 2 mm or more from the key hole, about 3 mm or more from the key hole, 4 mm or more from the key hole, or even 5 mm or more from the key hole on both sides of the key hole. Additional aspects of tensioning devices and related parts can be gleaned from the teachings herein, including those of FIGS. 5-6, 9A, 11, and 12A-C of Provisional application Ser. No. 61/343, 422, dated Jun. 10, 2010, incorporated by reference herein, which shows various alternative embodiments.

The present teachings may be included in "new" cargo support systems. However, it is contemplated that the present teachings may be included in existing cargo support systems so that the support cross members may be moved in one movement.

The present teachings may be used in conjunction with method steps. The method may include the steps of: a method of moving a support cross member comprising: operating a lock actuating tensioning mechanism; pivoting one or more locks mounted on ends of the support cross member that are connected to a lock actuating device; moving the support cross member; and releasing the lock actuating tensioning mechanism so that the one or more locks secure the support cross member to one or more tracks. Other possible method steps include: a method of moving a support cross member of a cargo support system of a transport vehicle comprising: inserting an operating rod into a key hole in the cam mechanism; moving the cam mechanism and a lock actuating device that is connected to the cam mechanism; pivoting one or more locks mounted on ends of the support cross member that are connected to the lock actuating device; moving the support cross member; and releasing the cam mechanism so that the one or more locks secure the support cross member to one or more tracks. Yet more method steps may include: A method of moving a support cross member comprising: locking the support cross member to a pair of generally opposed and vertically oriented tracks by way of generally releasable locks located at ends of the support cross member; operatively engaging the locks with a tensioning device of the support cross member; applying a force to the tensioning device of the support cross member at an intermediate location of the support cross member to release the locks so that the support cross members raise and lower at both ends simultaneously.

The method may further include the steps of inserting an operating rod into a key hole; inserting an operating rod into a cam mechanism; moving a cam mechanism; pushing the operating rod against a lock actuating device or a trigger cable; operating a lock actuating tensioning mechanism; applying a torsional force to the lock actuating device; or a combination thereof.

FIG. 1 illustrates one embodiment of the present teachings located in a container 32. The container 32 has tracks 30 located on the walls of the container 32 with a support cross member 8 attached to the tracks 30. Each support cross member 8 has an end portion 26 and an intermediate portion 28. The support cross members 8 each include a lock 4 with a lock actuating device 6 for actuating the lock and for adjustably moving the support cross members in the direction of the arrows.

Figure 2A:
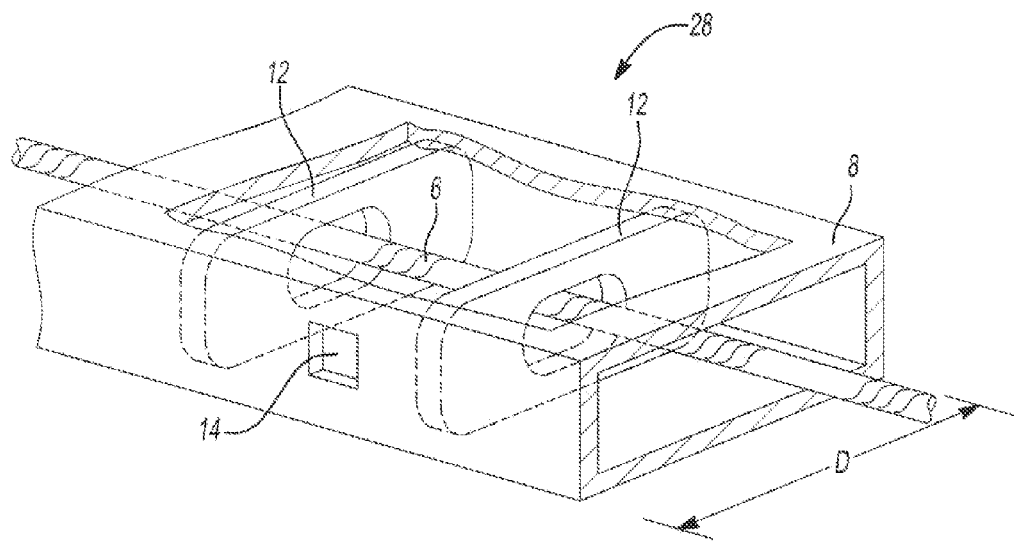
FIGS. 2A-2B illustrate possible embodiments of tensioning devices.
Figure 2B:
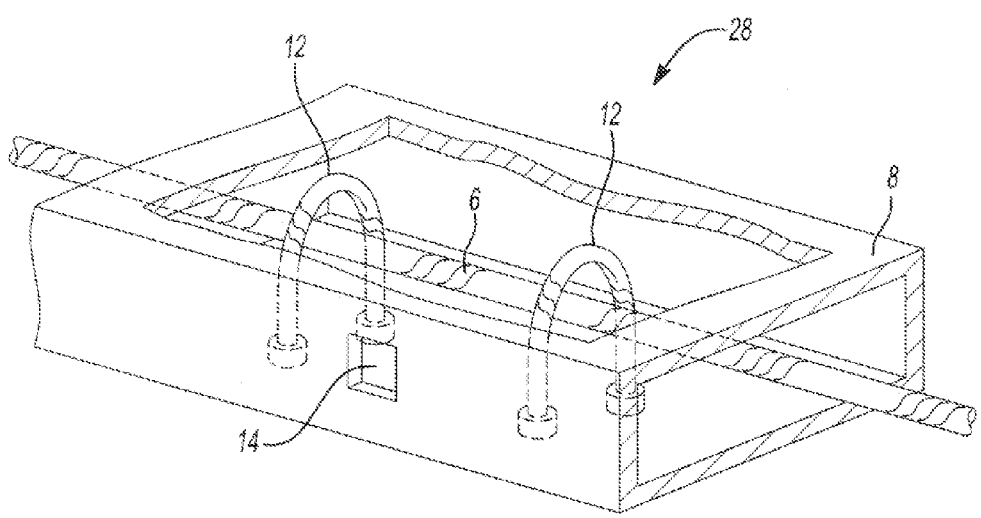

FIGS. 2A-2B illustrate enlarged views of possible examples of an intermediate portion 28 of FIG. 1. FIGS. 2A and 2B illustrate a support cross member 8 that is used in conjunction with an operating rod (not shown). FIG. 2A illustrates a support cross member 8 with two tensioning devices 12 on either side of the key hole 14. The tensioning devices 12 are doughnut shaped with the lock actuating device 6 running through the center of the tensioning device. FIG. 2B illustrates a support cross member with two "U" shaped tensioning devices 12 on either side of the key hole 14. The support cross member 8 has a depth (D). The depth (D) limits the distance that the lock actuating device 6 can be pushed so that the locks (not shown) are actuated. The tensioning devices 12 lateral location from the key hole 14 determines how far the lock actuating device may be pushed by the operating rod (not shown) before the locks are actuated and without the operating rod hitting a wall of the support cross member 8 and, thus, not actuating the locks.

FIG. 2C-2C'' illustrates additional enlarged embodiments of the present teachings that include a cam mechanism 16 with a key hole 14. FIG. 2C is a perspective view of the cam mechanism 16 with the lock actuating device 6 attached to an outside edge of the cam mechanism 16. The cam mechanism 16 is actuated by the operating rod 22 rotating the cam mechanism 16. The operating rod extends through a key hole 14 into the cam mechanism 16 so that the user can rotate the cam mechanism 16. FIG. 2C' illustrates one example of the present teachings in an original position (i.e. relaxed state). The cam mechanism is located in an additional extrusion chamber 18 that is placed in the support cross member of FIG. 1. FIG. 2C'' further illustrates the cam mechanism 16 with the key hole 14, in a rotated position 15, as indicated by the arrows. FIG. 2C'' further illustrates as shown by arrows that the lock actuating device 6 is pulled into the extrusion chamber 18 effectively shortening the total length of the lock actuating device 6 and actuating the locks (not shown).

FIGS. 2D and 2D' illustrate an enlarged view of one possible example of an intermediate portion 28 of FIG. 1. The intermediate portion 28 includes tensioning devices 12 that may be applied to the width (W) of the support cross member 8. The tensioning devices 12 are bolts that are placed through the carrier 8. Additionally, the bolts are structural bolts 10 and provide reinforcement to the beam. The structural bolts 10 are used to secure an extra extrusion piece in place (not shown). The key hole 14 exposes the lock actuating device 6 so that the lock actuating device 6 may be moved into contact with the tensioning devices 12 so that tension is created and locks (not shown) are actuated. The tensioning devices prevent the lock actuating device from extending the full depth of the beam 8 so that the lock actuating device 6 is free of contact with the back wall 34 of the beam. FIG. 2D illustrates a side view of the beam 8 when the lock actuating device 6 is in a relaxed state. FIG. 2D' illustrates a cross-sectional view of the beam 8 with an operating rod 22 actuating the lock actuating device 6 so that the lock actuating device is in a tensioned state. The tensioning devices 12 are allowing for tension to be created on the lock actuating device 6 (as indicated by the arrows) so that the locks are actuated which preventing the lock actuating device 6 from contacting the back wall 34.

FIG. 3 illustrates an enlarged view of the end portion 26 of the present teachings. The end portion includes a guide shoe 2 and a lock 4. The guide shoe 2 assists the beam 8 in attaching to the tracks (not shown) so that the beam 8 slides along the tracks. The lock 4 allows the beam 8 to lockingly attach to the tracks not shown so that the beam does not move other than when the lock actuating device 6 is actuated. A lock actuating device 6 may be attached to the lock 4 so that when pressure is applied to the lock actuating device 6 the lock is actuated. The guide shoe 2 and lock 4 are located at ends of the support cross member 8.

FIG. 4 illustrates an operating rod 22 that may be used with the present teachings. The operating end includes an operating end 36 and a handle 38. FIGS. 5A-5C illustrate some possible examples of operating rods 22 that include stops 24 proximal the operating end 36. The operating rod of FIG. 5B is illustrated with the operating end 36 being placed in a key hole 14 of the beam 8 so that tension may be created in the lock actuating device (not shown). FIG. 5C illustrates a side view of the operating rod 22 pushed into the key hole 14 so that the stop 24 contacts the carrier 8.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Though the teachings are not limited thereto, the relative positions and proportions of elements depicted in the drawings are contemplated as within the present teachings. Dimensions and proportions may vary from those depicted. For example, they may be within about 10%, 20%, 30%, 40%, 50% or more from the dimensions shown. Elements shown in one embodiment are not limited to such embodiment, and may be combined with elements in other embodiments.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. An adjustable cargo support system comprising:
    a) at least one pair of spaced apart tracks that are generally vertically oriented and proximate to opposing walls of a transport vehicle;
    b) at least one support cross member with two ends and an intermediate portion therebetween, each of the at least one support cross members comprising:
        i) a lock mounted to each of the two ends of the at least one support cross member; and
        ii) a lock actuating device, located in the intermediate portion, for adjusting a height of the support cross member;
        iii) one or more tensioning devices located within the at least one support cross member;
    c) a guide shoe on the ends of the at least one support cross member and movably connected to each of the at least one pair of spaced apart tracks, wherein the locks are mounted on the at least one guide shoe and are movably connected to the at least one pair of spaced apart tracks; and
    d) an operating rod
        wherein the one or more tensioning devices are a cam mechanism having a key hole therein for receiving the operating rod;
        wherein the lock actuating device is located inside the at least one support cross member and operatively connected to the one or more locks by way of the cam mechanism; and
        wherein the operating rod is inserted into the key hole and into communication with the lock actuating device so that the locks are moved simultaneously so that the at least one support cross member is moved upend down along the one or more tracks; and
        wherein lock actuating device includes one actuator device that is generally located between the support cross member ends, and in communication with the one or more tensioning devices located within the at least one support cross member so that a user can adjust the height of the support cross member at the intermediate portion by simultaneously actuating the locks mounted to each of the two ends of the at least one support cross member, thereby allowing the support cross member to be moved generally vertically without the user alternatingly having to move one end of the support cross member and then the other end of the support cross member.

2. The adjustable cargo support system of claim 1, wherein the at least one support cross member includes an additional extrusion chamber.

3. The adjustable cargo support system of claim 1, wherein the lock actuator device is generally slack when connected to the ends of the at least one support cross member.

4. The adjustable cargo system of claim 3, wherein the one or more tensioning devices span the width of the at least one support cross member.

5. The adjustable cargo system of claim 3, wherein the adjustable cargo system includes two tensioning devices and the tensioning devices are located equal distance from a key hole so that when a force is applied the tensioning devices are equally contacted so that an even force is distributed between the locks mounted to each of the two ends of the at least one support cross member, and
    wherein the two tensioning devices are doughnut shaped and the lock actuating device runs through a center of the two tensioning devices.

6. The adjustable cargo support system of claim 1, wherein by applying a force to the lock actuating device causes tension in the lock actuating device and actuates the locks.

7. The adjustable cargo support system a claim 6, wherein the one lock actuating device has two discrete pieces that are attached on opposing sides of the cam mechanism and span the full length of the at least one support cross member so that when the cam mechanism is rotated the lock actuating device actuates the locks.

8. The adjustable cargo support system of claim 1, wherein applying a torsional force to the lock actuating device causes tension in the lock actuating device so that the locks are actuated.

9. The adjustable cargo support system of claim 1, wherein the lock actuating device is located proximate to the center of the support cross member.

10. The adjustable cargo support system of claim 1, further including a reinforcing structure in the at least one support cross member so that apertures formed in the at least one support cross member for accessing the actuating device retain integrity.

11. The adjustable cargo support system of claim 1, wherein the system is retrofitted into an existing support cross member.

12. A method of moving the support cross member of claim 1 comprising:
   a) inserting the operating rod into the key hole in the cam mechanism;
   b) moving the cam mechanism and the lock actuating device that is connected to the cam mechanism;
   c) moving the one or more locks mounted on ends of the support cross member that are connected to the lock actuating device;
   d) moving the support cross member; and
   e) releasing the cam mechanism so that the one or more locks secure the support cross member to one or more tracks.

13. The method of moving the support cross member of claim 12, further including applying a torsional force to the lock actuating device.

14. A method of moving the support cross member of claim 1 comprising:
   a) operating a lock actuating tensioning mechanism;
   b) simultaneously moving the locks mounted on ends of the support cross member that are connected to a lock actuating device;
   c) moving the support cross member; and
   d) releasing the lock actuating tensioning mechanism so that the one or more locks secure the support cross member to one or more tracks.

15. The method of moving the support cross member of claim 14, further including applying a torsional force to the lock actuating device.

16. A method of moving the support cross member of claim 1 comprising:
   a) locking the support cross member to the pair of generally opposed and vertically oriented tracks by way of the locks located at ends of the support cross member;
   b) operatively engaging the locks with the one or more tensioning devices of the support cross member;
   c) applying a force to the lock actuating and the tensioning device of the support cross member to release the locks so that both ends of the support cross members can be raised and low red simultaneously.

17. The method of moving the support cross member of claim 16, further including applying a torsional force to the lock actuating device.

* * * * *

UNITED STATES PATENT AND TRADEMARK OFFICE
CERTIFICATE OF CORRECTION

PATENT NO. : 8,388,287 B2
APPLICATION NO. : 13/156535
DATED : March 5, 2013
INVENTOR(S) : Mark E. Arnold and Steven E. Downing Page 1 of 1

It is certified that error appears in the above-identified patent and that said Letters Patent is hereby corrected as shown below:

In the Claims:

Column 10, line 25, "upend down along the one or more tracks; and" should read
-- up and down along the one or more tracks; and --.

Column 10, line 26, "wherein lock actuating device includes one actuator-" should read
-- wherein the lock actuating device includes on actuator --.

Signed and Sealed this
Twenty-first Day of May, 2013

Teresa Stanek Rea
*Acting Director of the United States Patent and Trademark Office*